US005549879A

United States Patent [19]

Chow

[11] Patent Number: 5,549,879

[45] Date of Patent: Aug. 27, 1996

[54] PROCESS FOR PULSE FLOW DOUBLE-JET PRECIPITATION

[75] Inventor: Lu Chow, Fairport, N.Y.

[73] Assignee: Eastman Kodak Company, Rochester, N.Y.

[21] Appl. No.: 311,093

[22] Filed: Sep. 23, 1994

[51] Int. Cl.$^6$ .............................. C01G 5/02; G03C 1/005

[52] U.S. Cl. ........................... 423/491; 430/567; 430/568

[58] Field of Search ............................ 423/491; 430/567, 430/568, 564

[56] References Cited

U.S. PATENT DOCUMENTS

| | | | |
|---|---|---|---|
| 3,415,650 | 12/1968 | Frame et al. | 96/94 |
| 4,147,551 | 3/1979 | Finnicum et al. | 430/567 |
| 4,289,733 | 9/1981 | Saito et al. | 422/227 |
| 4,335,199 | 6/1982 | Micheurich et al. | 430/567 |
| 4,399,215 | 8/1983 | Wey | 430/567 |
| 4,539,290 | 9/1985 | Mumaw | 430/567 |
| 4,666,669 | 5/1987 | Mumaw | 422/116 |
| 5,035,991 | 7/1991 | Ichikawa et al. | 430/569 |
| 5,096,690 | 3/1992 | Saito | 423/491 |
| 5,104,785 | 4/1992 | Ichikawa et al. | 430/569 |
| 5,145,768 | 9/1992 | Ichikawa et al. | 430/569 |
| 5,219,720 | 6/1993 | Black et al. | 430/569 |

FOREIGN PATENT DOCUMENTS

| | | | |
|---|---|---|---|
| 0137398 | 4/1985 | European Pat. Off. | 423/491 |

*Primary Examiner*—Ngoc-Yen Nguyen
*Attorney, Agent, or Firm*—Arthur H. Rosenstein

[57] ABSTRACT

The present invention is a method of manufacturing silver halide grains using a double jet precipitation process. Soluble salt and soluble halide salt are introduced at a high velocity into a well mixing vessel containing silver halide grains for a time t. The introduction is halted for a time T, wherein T>t. No emulsion is removed from the reactor. The present invention provides precise control of the silver halide grain growth and provides improved scaleability.

4 Claims, 1 Drawing Sheet

PROCESS FOR PULSE FLOW DOUBLE-JET PRECIPITATION

FIELD OF THE INVENTION

The present invention is drawn to an improved double-jet precipitation process. More specifically, the present invention is a method for making silver halide emulsions that is highly precise and improves scaleability and transferability.

BACKGROUND OF THE INVENTION

Double-jet precipitation is a common practice in the making of silver halide emulsions. Silver salt solution and halide salt solution are introduced simultaneously, but separately, into the precipitation reactor under mixing. In order to achieve the desired crystal characteristics, typically, the silver ion activity or the halide ion activity is controlled during the precipitation by adjusting the feed rates of the salt solutions using either a silver ion sensor or a halide ion sensor.

Quite often the crystal characteristics change when the process is scaled up or down or transferred to a different reactor. A possible explanation for this change is that silver ion or halide ion activities are not homogeneous throughout the reactor. Thus, although they may be under control at certain locations in the reactor, the concentration profiles are not necessarily reproduced when the reactor is changed. Different concentration profiles of silver ion or halide ion activities in the reactor during precipitation can cause differences in crystal characteristics.

For yield reasons, practical silver halide emulsions are always made by feeding highly concentrated silver salt and halide salt solutions (typically higher than 0.5 moles per liter) to the reactor. The solubility of the silver halide is low, e.g., $10^{-6}$ moles per liter at 70° C. for silver bromide. Thus, in the case of silver bromide emulsions made under conditions of 70° C. and $10^{-2}$M bromide ion activity, the silver ion and bromide ion activities need to drop from the molar range at the introduction point down to somewhere near $10^{-6}$ and $10^{-2}$ moles per liter respectively in the bulk emulsion. The magnitude of this drop basically guarantees an inhomogeneity in activity of the silver ion and the halide ion.

It is possible that this inhomogeneity in reaction activities can be largely obviated. A hypothetical situation is that if the reactant solutions are instantaneously converted into small nuclei of silver halide at the introduction point, and later redissolved to precipitate onto the existing grains in the bulk solution, the entire drop in reactant activities takes place at the introduction point and the great majority of the reactor can be homogeneous so long as the mixing of the bulk solution is efficient. To what extent this ideal situation is achieved in practical systems depends on the kinetics of nucleation and hydrodynamics at the introduction point. Fast kinetics and effective mixing of the reactants favors the efficient formation of nuclei.

A different view of this problem is to recognize that the inhomogeneity of the reactant activities originates in the introduction of the halide salt and silver salt solutions. When the introduction stops, given efficient bulk mixing, the emulsion is quickly homogenized. Conceptually, if a process is designed in a way such that the time involved in feeding reactant solutions is short compared to that of the entire precipitation reaction, the reactor should be homogeneous most of the time, and an accurate control of reactant activities can be achieved.

In the apparatus disclosed in U.S. Pat. Nos. 4,289,733 and 5,096,690 an approach is taken to better control the hydrodynamics at the introduction point by creating a well-defined primary zone which is separated from the bulk of the reaction vessel. The apparatus and process described in these patents takes the approach of confining the inhomogeneity to a primary mixing zone and hoping that the rest of the reactor will be homogeneous. However, these patents make no attempt to enhance the rate of nucleation. Although the kinetics of nucleation depend somewhat on the silver halide involved, the rate of nucleation is proportional to the level of supersaturation. For a given mixing condition, the higher the feed rate and concentration of the reactants, the higher the supersaturation at the introduction point, and hence the higher the rate of nucleation. As mentioned earlier, when the rate of nucleation is sufficiently high, the inhomogeneity of the reactants will be confined to a small vicinity of the introduction point and this eliminates the need for a physical boundary to define the primary reaction zone described in the above-mentioned patents. Based on this concept, the reactant solution should be introduced at a high flow rate and simultaneously so that when mixed, high supersaturation is achieved to maximize the rate of nucleation.

Another approach suggested in the prior art is the addition of silver salt and halide salt alternately as described in U.S. Pat. No. 4,666,669. However, this process emphasizes the benefit of reactant dilution at the introduction point and, therefore, the rate of nucleation is limited.

The present invention solves the problems of the prior art and provides a double jet process that is highly precise and allows transference from pilot to production scale.

Figure 1:
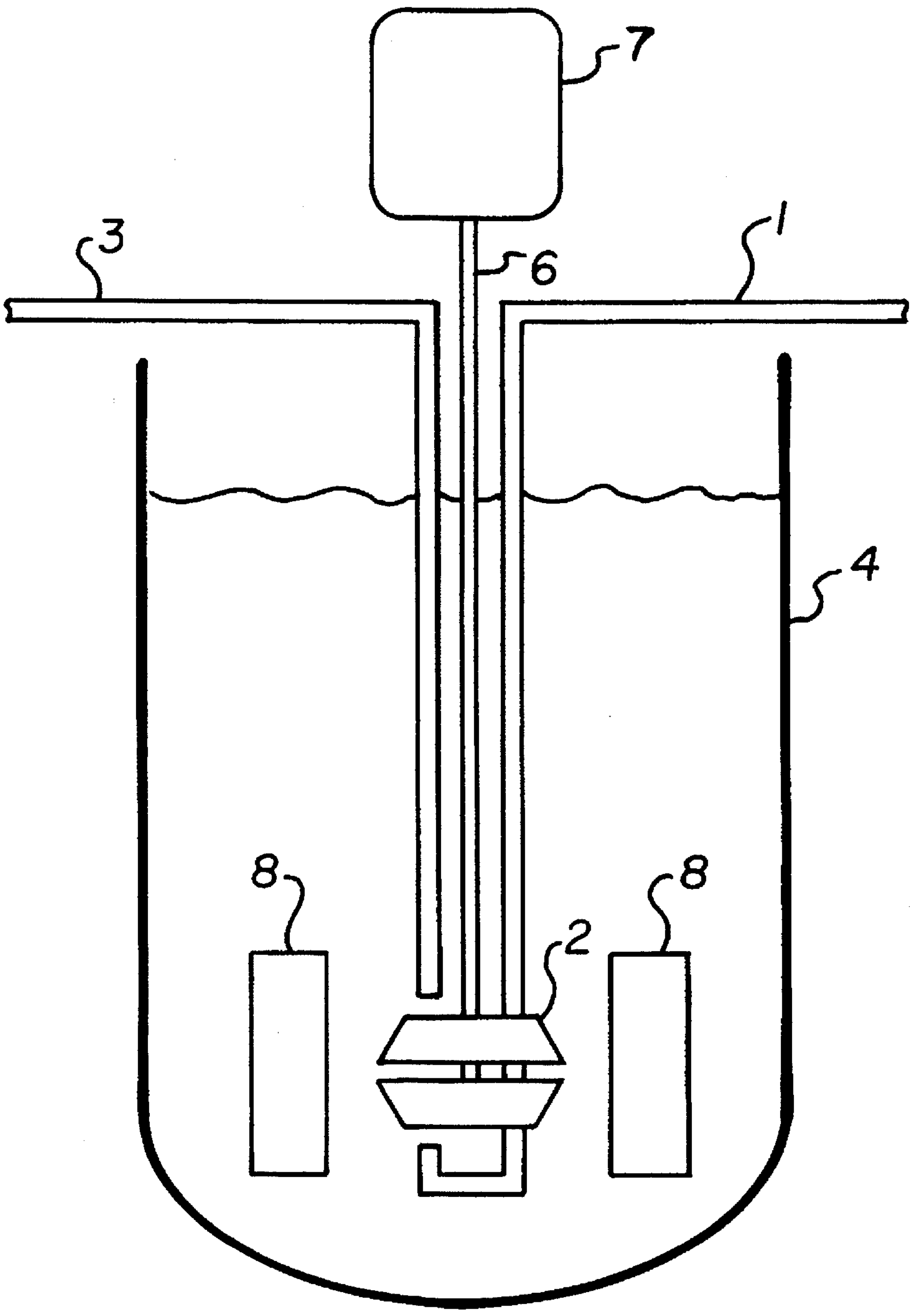
FIG. 1 is a side elevation view of the apparatus used in the present invention.

For a better understanding of the present invention together with other objects, advantages and capabilities thereof, reference is made to the following description and appended claims in connection with the above-described drawings.

SUMMARY OF THE INVENTION

The present invention is a method for manufacturing silver halide grains comprising, providing an aqueous solution containing silver halide particles and continuously mixing the aqueous solution containing the silver halide particles. A soluble silver salt solution and a soluble halide salt solution are simultaneously introduced into the aqueous solution at a high flow rate for a predetermined time t. This introduction is halted for a predetermined time T, wherein T>t, thereby allowing the silver halide particles to grow. The simultaneous introduction and halting of the introduction of silver salt and halide salt solutions is repeated until the silver halide particles attain a predetermined grain size.

DESCRIPTION OF THE PREFERRED EMBODIMENTS

The present invention is a process for making silver halide emulsions that provides precise control and allows improved scaleability and transferability. Concentrated silver and halide salt solutions are introduced simultaneously into a reactor at a relatively high flow rate for a short period of time, t, and the introduction is then stopped for a relatively long period of time, T, to allow the nuclei formed to ripen in the reactor before initiating the next introduction. The quantities,of silver and halide salt solutions are balanced in that the dilution of the emulsion by feed solutions and the change in ionic strength are taken into consideration to provide control of the activity of the silver ion or the halide ion. Fine tuning of the control can be exercised during time, T. The control sensor can be placed anywhere in the bulk solution because this solution is homogeneous. The introduction time, t, should in general not be significantly longer than the mixing turnover time $\tau$ (defined as the volume of the contents of the reactor divided by the pumping rate of the mixing device) to avoid renucleation. The introduction time t is preferably be shorter than $\tau$ ($t<\tau$). The rest time, T, should in general be significantly longer than the mixing cycle time $\tau$. The benefit is maximized when t/T ratio is minimized.

In accordance with this process, aqueous silver nitrate solution is introduced from a remote source by a conduit 1 as shown in FIG. 1 which terminates close to an adjacent inlet zone of a mixing device 2. Simultaneously with the introduction of the aqueous silver nitrate solution and in opposing direction, aqueous halide solution is introduced from a remote source by conduit 3 which terminates close to an adjacent inlet zone of the mixing device 2. The mixing device is vertically disposed in vessel 4 and attached to the end of shaft 6, driven at high speed by any suitable means, such as motor 7. The lower end of the rotating mixing device is spaced up from the bottom of vessel 4, but beneath the surface of the aqueous silver emulsion contained within the vessel. Baffles 8, sufficient in number to inhibit vertical rotation of the contents of vessel 4 are located around the mixing device.

The mixing device is described in more detail in PCT/US94/07378, filed Jun. 30, 1994. Although the mixing head described in the PCT application was used in the examples described below. The invention is applicable to any type of mixing device, as for example, as described in U.S. Pat. No. 3,415,650.

In operation, the mixing head is rotated at high speed by shaft 6 which is driven at a speed of at least 1000 rpm. The mixing head is generally activated throughout the operation. The halide salt and silver salt solutions as well as the aqueous silver emulsion contained therein enter the mixing chamber at high velocity through the inlet zones. The following examples are provided to show the utility of the present invention.

EXAMPLE 1

A 6-liter reactor equipped with the mixing device described in PCT application PCT/US94/07378 was loaded with 3 liters of 0.01 molar sodium chloride solution which contained $3.0\times10^{13}$ grains of a 0.44 micron size cubic silver chloride grains. Silver nitrate solution and sodium chloride solution both at 1 molar concentrations were introduced into the reactor simultaneously as pulse flow. The mixing head was rotated at 2000 rpm. Five pulses of increasing flow rate were applied. The duration of each pulse was 2 seconds and there was a rest period of 238 seconds between them. The flow rates for the 5 silver nitrate pulses were 30, 60, 90, 120, and 150 mls per minute corresponding to 1, 2, 3, 4 and 5 mls delivered. The chloride ion activity of the emulsion was monitored with a chloride ion sensor prepared by coating a silver rod with silver chloride. The electrode potential measured against a commercial silver chloride reference electrode corresponded to the chloride ion activity. The chloride ion activity was observed to stay constant during the rest time and feedback control was not necessary.

EXAMPLE 2

A 6-liter reactor equipped with the mixing device described in PCT application PCT/US94/07378 was loaded with 3 liters of 0.05 molar sodium chloride solution which contained 0.2 moles of 0.27 micron size cubic silver chloride grains. The grains were grown to a 0.57 micron size by introducing silver nitrate solution and sodium chloride solution, both at 2 molar concentration in continuous flow at ramps from 15 ml per minute to 35 ml per minute for a total flow delivery of 900 ml of silver nitrate. The mixing head was rotated at 2000 rpm. Chloride ion activity was controlled at a constant level by a feedback loop using a chloride ion sensor. After the growth, the grains were observed to have rounded corners.

The experiment process was repeated using the pulse flow operation of the present invention which included delivering pulses of a 2 second duration followed by a 58 second rest before initiating the next pulse. The silver nitrate pulses increased from 15.3 ml (at a flow rate of 459 ml/min) to 34.7 ml (at a flow rate of 1091 ml/min) and the total delivered volume was 900 ml. In order to account for the dilution factor, sodium chloride pulses were adjusted to be higher than those of silver nitrate. The amount of adjustment is based on the volume of reactants added. The chloride ion activity was observed to stay nearly constant without feedback control. The grains were observed to have sharp edges.

The advantages of the present invention include improved control of the activities of reactants. Control of the reactant activities is critical to the result and characteristics of the emulsion crystals. The present invention allows the reactor to be homogeneous essentially all of the time for precise control. The present invention also improves scaleability and transferability. Silver halide precipitation processes are driven by the activities of the silver and halide ions. When they are under precise control, the reactor design becomes transparent to the process which leaves scaleability as an insignificant issue. Finally, improved crystal characteristics are obtained by manipulating the flow rate and the duration of the feed. The supersaturation of the reactor can vary to control the crystal morphology. High flow rate and short duration pulses increase the rate of nucleation which results in lower supersaturation in the reactor. Alternatively, low flow rate and longer duration pulses approach the situation of a continuous flow process which creates higher average supersaturation near the introduction point.

While there has been shown and described what are present considered the preferred embodiments of the invention, it will be obvious to those skilled in the art that various alterations and modifications may be made therein without departing from the scope of the invention.

What is claimed is:

1. A method of manufacturing silver halide grains comprising:

a) providing an aqueous solution containing silver halide particles having a first grain size;

b) continuously mixing the aqueous solution containing silver halide particles;

c) simultaneously introducing a soluble silver salt solution and a soluble halide salt solution into a reaction zone of high velocity turbulent flow confined within the aqueous solution for a time t, wherein high velocity being at least 1000 rpm;

d) simultaneously halting the introduction of the soluble silver salt solution and the soluble halide salt solution into the reaction for a time T wherein T>t, thereby allowing the silver halide particles to grow; and e) repeating steps (c) and (d) until the silver halide particles attain a second grain size greater than the first grain size.

2. The method according to claim 1 wherein the continuous mixing of the aqueous solution produces a mixing turnover time $\tau$ wherein $t<\tau$ and $T>\tau$.

3. The method according to claim 1 wherein the silver halide particles provided in step (a) are approximately 0.27 micron to about 0.44 cubic micron size.

4. The method according to claim 1 wherein t is approximately 2 seconds and T is from about 58 to about 238.

* * * * *